(12) United States Patent
Mildner et al.

(10) Patent No.: US 8,602,488 B2
(45) Date of Patent: Dec. 10, 2013

(54) VEHICLE CHASSIS STRUCTURE

(75) Inventors: Udo Mildner, Limburg (DE); Stefan Gloger, Muehital (DE)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 13/071,088

(22) Filed: Mar. 24, 2011

(65) Prior Publication Data

US 2011/0241386 A1 Oct. 6, 2011

(30) Foreign Application Priority Data

Mar. 30, 2010 (DE) .................... 10 2010 013 383

(51) Int. Cl.
*B62D 25/20* (2006.01)

(52) U.S. Cl.
USPC .............. 296/204; 296/193.07; 296/193.09

(58) Field of Classification Search
USPC ............. 296/187.08, 187.09, 187.12, 191, 296/193.01, 193.05, 193.07, 193.09, 296/203.02, 203.03, 204, 205, 209
See application file for complete search history.

(56) References Cited

U.S. PATENT DOCUMENTS

| | | | | |
|---|---|---|---|---|
| 2,126,607 A * | 8/1938 | Boehner | ................ | 280/797 |
| 3,419,303 A * | 12/1968 | Eggert, Jr. et al. | ............ | 296/204 |
| 3,971,588 A | 7/1976 | Bauer | | |
| 4,557,519 A * | 12/1985 | Matsuura | ................ | 296/204 |
| 4,836,321 A | 6/1989 | Baumann | | |
| 5,002,333 A * | 3/1991 | Kenmochi et al. | ............ | 296/204 |
| 5,806,918 A * | 9/1998 | Kanazawa | .................... | 296/204 |
| 6,679,546 B2 * | 1/2004 | Mishima et al. | ......... | 296/203.01 |
| 2005/0082876 A1 | 4/2005 | Akasaka | | |
| 2005/0151394 A1 * | 7/2005 | Grueneklee et al. | .......... | 296/204 |
| 2008/0169681 A1 | 7/2008 | Hedderly | | |
| 2008/0258506 A1 * | 10/2008 | Egawa et al. | ................ | 296/204 |
| 2009/0001766 A1 | 1/2009 | Kurata | | |
| 2009/0001769 A1 * | 1/2009 | Kurata | ......................... | 296/204 |
| 2010/0078967 A1 * | 4/2010 | Boettcher | ............... | 296/193.07 |

FOREIGN PATENT DOCUMENTS

| | | | |
|---|---|---|---|
| DE | 2336213 | A1 | 2/1975 |
| DE | 2408548 | A1 | 8/1975 |
| DE | 4205891 | A1 | 9/1993 |
| DE | 10014837 | A1 | 9/2001 |
| DE | 20023723 | U1 | 10/2005 |

(Continued)

OTHER PUBLICATIONS

German Patent Office, German Search Report for German Application No. 102010013383.3, dated Feb. 9, 2011.

(Continued)

*Primary Examiner* — Glenn Dayoan
*Assistant Examiner* — Jason S Daniels
(74) *Attorney, Agent, or Firm* — Ingrassia Fisher & Lorenz, P.C.

(57) ABSTRACT

A vehicle chassis structure includes, but is not limited to a central tunnel extending in the longitudinal direction of the vehicle, plate sections extending on both sides of the central tunnel, and two longitudinal beams projecting over a front edge of the plate sections, which are constructed respectively in one piece with two branches, an inner branch of which extends on one of the plate sections to the central tunnel, and an outer branch is connected with an outer sill, which extends on an edge, facing away from the central tunnel, of one of the plate sections.

17 Claims, 3 Drawing Sheets

(56) References Cited

FOREIGN PATENT DOCUMENTS

| DE | 102005024265 A1 | 12/2006 |
| DE | 102006004045 A1 | 8/2007 |
| DE | 102006015872 A1 | 10/2007 |

OTHER PUBLICATIONS

GB Search Report for Application No. GB1104250.4 dated Jun. 30, 2011.

* cited by examiner

VEHICLE CHASSIS STRUCTURE

CROSS-REFERENCE TO RELATED APPLICATION

This application claims priority to German Patent Application No. 102010013383.3, filed Mar. 30, 2010, which is incorporated herein by reference in its entirety.

TECHNICAL FIELD

The technical field relates to a chassis for a motor vehicle.

BACKGROUND

From DE 200 23 723 U1 a chassis structure is known with a central tunnel extending in the longitudinal direction of the vehicle and with plate sections extending on both sides of the central tunnel, forming a floor of the passenger compartment. The plate sections are organized respectively into front and rear floor panels. In order to achieve a high torsional rigidity and, in the case of a frontal collision, a favourable transmission of force into an adjoining bodywork structure, it is proposed in this publication to join together connecting elements of the front and rear floor panels to a hollow section unit running transversely to the central tunnel. As the chassis structure shown in this document does not extend towards the front and rear identifiably beyond the limits of the passenger compartment, it remains open how the forces occurring in a frontal collision can be introduced into the chassis structure so that a transmission is possible from there into the bodywork structure.

It is at least one object to indicate a vehicle chassis structure which makes it possible, in the case of a frontal collision, to dissipate large amounts of energy and, in so doing, to prevent an excessive deformation of the passenger compartment, endangering the occupants. In addition, other objects, desirable features and characteristics will become apparent from the subsequent summary and detailed description, and the appended claims, taken in conjunction with the accompanying drawings and this background.

SUMMARY

Two longitudinal beams are provided projecting over a front edge of the plate sections being constructed respectively in one piece with two branches, in a vehicle chassis structure with a central tunnel extending in the longitudinal direction of the vehicle and with plate sections extending on both sides of the central tunnel, of which branches an inner branch extends on one of the plate sections to the central tunnel and an outer branch is connected with an outer sill which extends on an edge of the one plate section, facing away from the central tunnel. In the case of a collision, compression forces transferred to one of the longitudinal beams are introduced in this chassis structure on the one hand into the central tunnel and on the other hand into the outer sill, i.e., the forces are distributed to the regions of the chassis structure which respectively have the highest load capacity. The branches preferably extend substantially at right angles to the longitudinal beams.

According to an embodiment, the branches are hat-shaped in cross-section with marginal webs fastened to the plate sections, forming a cavity. By the marginal webs being fastened to the plate sections, the branches are supplemented with the plate sections to form highly resilient, bending-resistant hollow profiles. In order to increase the load capacity of the central tunnel in the case of a collision, at least one central tunnel reinforcing element can be provided, which extends in the longitudinal direction of the central tunnel and delimits with the latter at least one cavity extending in the longitudinal direction.

According to another embodiment, such a central tunnel reinforcing element is arranged in each case on each side of the central tunnel, and the cavity which is delimited by the central tunnel reinforcing element extends along an edge at which the central tunnel and a plate section adjacent to the central tunnel on this side abut. The cavity thus comes to lie substantially at the same height as the above-mentioned branches, and a force which is transferred from the branches in the case of a collision can be efficiently introduced into the central tunnel and the central tunnel reinforcing element. So as not to limit the space available in the passenger compartment, the central tunnel reinforcing element is preferably joined to the plate section from below.

The central tunnel reinforcing element can be produced as an independent component and mounted on the plate section and central tunnel. However, a chassis structure is able to be manufactured particularly efficiently, in which the central tunnel reinforcing element is constructed in one piece with the central tunnel. An outer edge of the central tunnel reinforcing element can then be fastened to an underside of the adjacent plate section, whilst an inner edge of the plate section is fastened to a side wall of the central tunnel.

At least one of the plate sections is preferably organized into a front and a rear floor panel and a central floor panel arranged at a higher level between the front and the rear floor panel. The floor panels can be constructed here as individual parts, which are to be connected with each other, or as regions of a plate section which is cohesive in one piece. The front and rear floor panels can form respectively the foot space for front and rear seats of the vehicle, whilst the central floor panel comes to lie under a front seat of the vehicle. The central tunnel reinforcing element preferably extends in one piece continuously from the front floor panel to the rear floor panel, in order to balance out a resilience of the plate section, which is increased by the different levels of the floor panels, under a compressing longitudinal force.

When the plate section is constructed in several parts, the central floor panel preferably has fastening flanges lying at its front and rear edge at the level of the front or respectively rear floor panel, whilst on at least one lateral edge a fastening flange, lying at a higher level, is formed for connecting with the central tunnel or with one of the outer sills. In order to simplify the assembly, the outer sill preferably has at least one first shoulder on which the front and the rear floor panels are fastened, and a second shoulder on which the central floor panel is fastened. The shoulders are preferably oriented horizontally or substantially horizontally and are longer than the flanges of the floor panels which are fastened on them, so that possible dimension tolerances in the longitudinal direction can be balanced out.

For further reinforcement of the chassis structure, a sill reinforcing element can be provided, which has an inner edge fastened on the underside of the front, the central and the rear floor panel and an outer edge fastened on the outer sill, preferably on a third shoulder beneath the first and second shoulder.

A component such as for instance a fuel tank, an exhaust gas filter, catalyser or silencer can advantageously be housed in the downwardly open recess delimited by the central floor panel.

In order to protect the component from damage by objects lying on the roadway, the branches which are connected with the projecting longitudinal beams are preferably fastened on an underside of the front floor panels and reach further downwards than the component, so that they, instead of the component, come in contact with such an obstacle.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
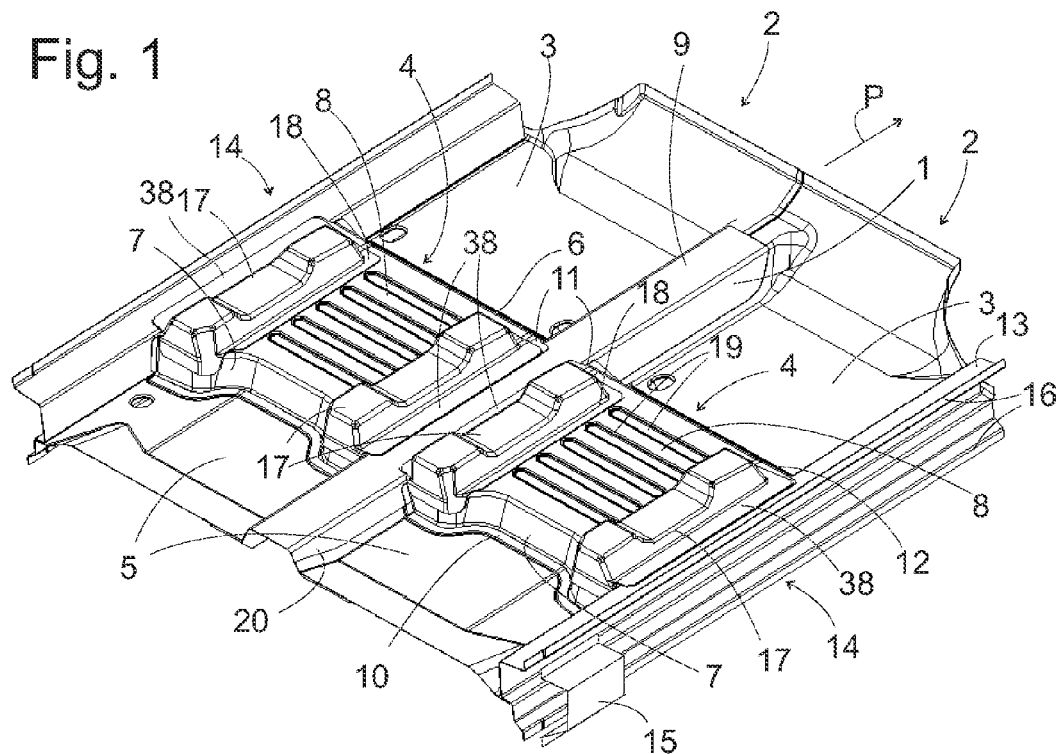
FIG. 1 is a perspective view from above of a central region of the vehicle chassis structure according to an embodiment.

FIG. 1 shows a perspective view of a central region of the chassis structure, viewed obliquely from the rear. The normal travel direction of the vehicle is indicated by an arrow P and is parallel to a central tunnel or transmission tunnel 1. Plate sections 2, which in the present case are joined together from respectively three elements, a front floor panel 3, a central floor panel 4 and a rear floor panel 5, extend on both sides of the central tunnel 1. The floor panels 3, 5 form respectively the foot space for a front or respectively rear row of seats of the vehicle and are substantially level.

The central floor panel 4 comprises substantially vertical front and rear flanks 6, 7 and a substantially horizontal core section 8 between the flanks 6, 7, which lie on a level which is several centimeters higher than the adjoining floor panels 3, 5 and approximately at the same height as an upper side 9 of the central tunnel 1. Horizontal flanges 10 (only the rear one of which is to be seen in FIG. 1), which are angled from the flanks 6, 7 of the central floor panel 4, are welded on the adjacent floor panels 3, 5. A flange 11, facing the centre of the vehicle, of each central floor panel 4 reaches onto the upper side 9 of the central tunnel 1 and is welded thereon. An outer flange 12 lying opposite the flange 11 is welded on an upper shoulder 13 of an inner sill profile 14. In the figure, only a short fragment of an outer sill profile 15 is shown, which is provided in order to be welded to flanges 16 forming upper and lower edges of the inner sill profile 14, and to form together therewith a sill extending beneath the doors of the vehicle.

The central floor panels 4 carry respectively two mounting elements 17, which are provided in order to mount rails (not illustrated) on them, on which the driver's and passenger's seats are able to be displaced in the longitudinal direction of the vehicle. The mounting elements 17, which are deep-drawn in one piece from sheet metal, have substantially the shape of elongated block-shaped boxes, the underside of which is open and is surrounded by a fastening flange, one part 18 of which in each case is welded on the core section 8, and another part 38 is welded on the upper side 9 of the central tunnel 1 or respectively the shoulder 13 of the inner sill profile 14, overlapping one of the flanges 11 or respectively 12 of the central floor panel 4. The mounting elements 17 thus contribute considerably to the longitudinal rigidity of the central floor panels 4. The rigidity of the floor panels 4 against torsion or transverse stress is increased in addition by a plurality of impressed corrugations 19, which extend between the two mounting elements 17 of each central floor panel 4.

Figure 2:
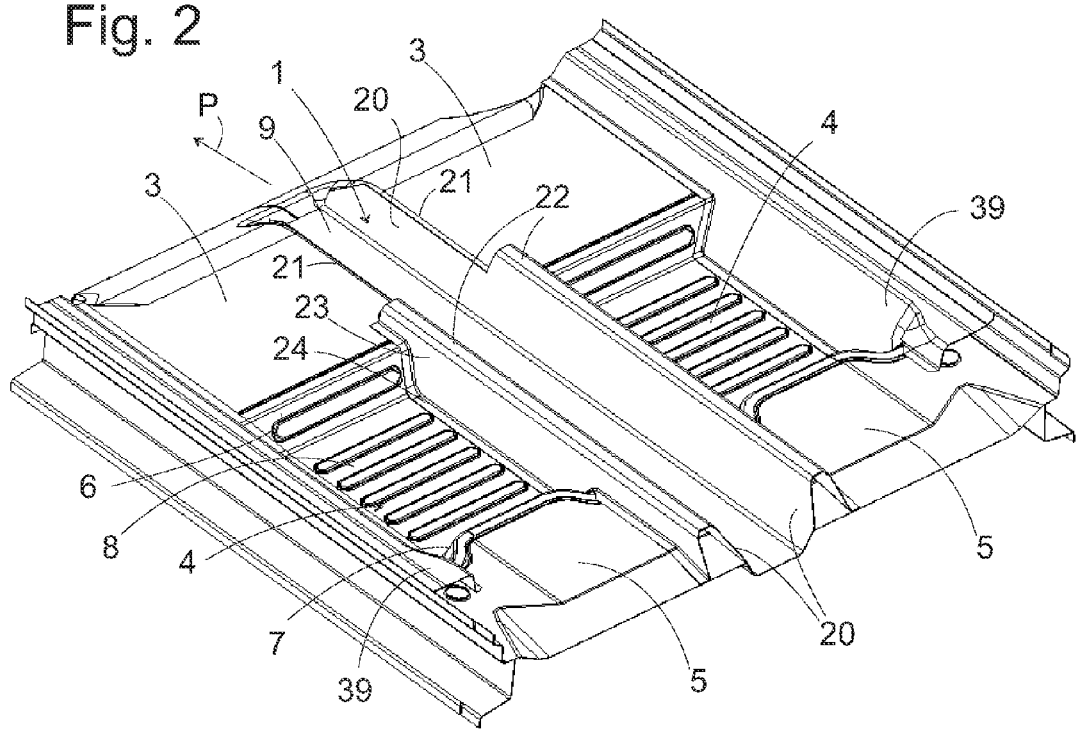
FIG. 2 is a perspective view of the central region, viewed obliquely from below.

FIG. 2 shows a perspective view of the same central region of the chassis structure as FIG. 1, but viewed obliquely from below, wherein again the arrow P designates the direction of travel of the vehicle. A front section of the central tunnel 1, between the front floor panels 3, has a reversed U-shaped cross-section in a manner known per se, with the central upper side 9 and flanks 20 running steeply downwards from its longitudinal edges, on the lower edges of which flanks 20 respectively a narrow weld flange 21 is angled for fastening the front floor panels 3. At the height of the central floor panels 4, the flanks 20 of the central tunnel 1 are extended downwards beyond the level of the weld flanges 21. Outer flanks 23 extend upward from the flanks 20 to define upwardly open channels 22, which extend from a rear edge of the front floor panel 3 over the central and the rear floor panel 4 or respectively 5. The outer flanks 23 serve as central tunnel reinforcement elements (not separately numbered). On the entire length of each channel 22, an upper edge is angled from the outer flank 23 of the channel 22, in order to form a weld flange 24, which extends over the entire length of the flank 23 and is welded to the floor panels 3, 5 and to the flanks 6, 7 and to the core section 8 of the central floor panel 4. In addition, as described later in more detail with the aid of FIGS. 5 and 6, by all floor panels 3, 4, 5 of a same plate section 2 having an edge welded to the flank 20 of the central tunnel 1 facing this plate section 2, the channels 22 together with the parts of the floor panels 3, 4, 5 closing them at the top, form two hollow sections on both sides of the central tunnel 1, which considerably increase its rigidity in the longitudinal direction.

Figure 3:
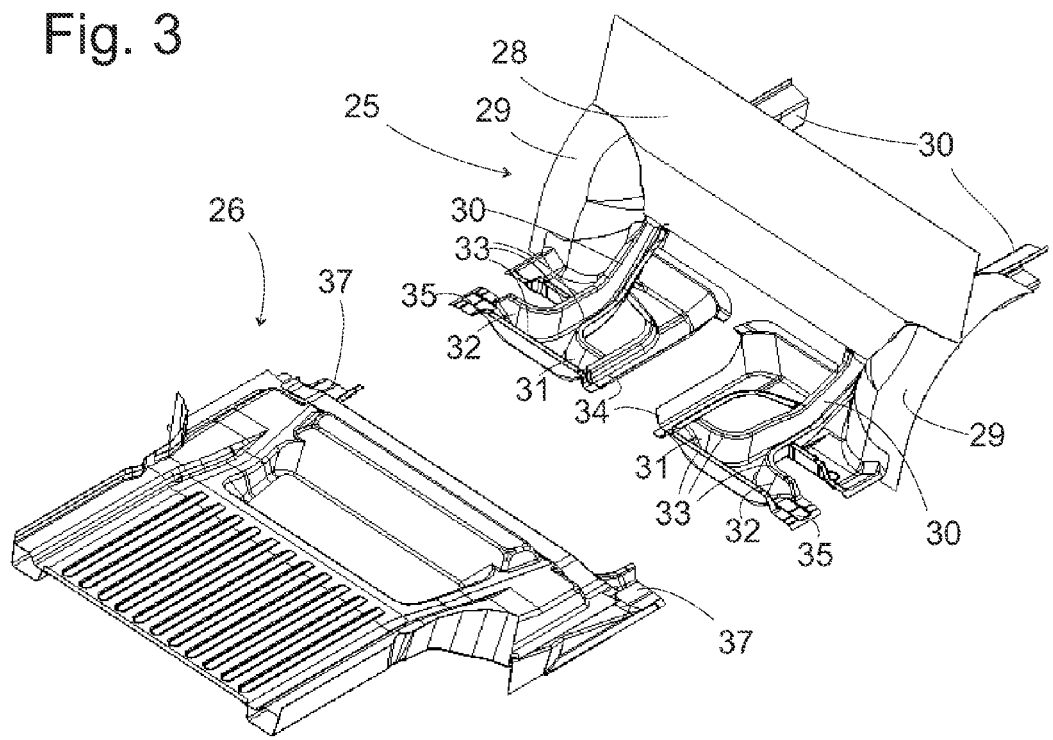
FIG. 3 is a view of front and rear regions of the chassis structure, viewed in the same perspective as the central region of FIG. 1.

FIG. 3 shows in the same perspective as FIG. 1 a front region 25 and a rear region 26 of the chassis structure that are provided in order to be securely connected with the central region which is shown in FIG. 1 and FIG. 2. The rear region 26 forms a rear part of the floor of the passenger compartment, which extends beneath the rear seats, and a loading area 27 of a boot of the vehicle.

The front region 25 comprises an end wall 28, which in the finished assembled state separates the passenger compartment from the engine compartment, front wheel arches 29 and two longitudinal beams 30 of substantially hat-shaped cross-section, open at the top in a rear region this side of the end wall 28 and to the side in a front region, on the other side of the end wall 28. The front ends of the longitudinal beams 30 hold a bumper cross beam, which is not illustrated in the figure. Two branches 31, 32 extend respectively in the transverse direction of the vehicle from the rear ends of the longitudinal beams 30 facing the observer in the figure. The longitudinal beams 30 and the branches 31, 32 extending from them are respectively formed in one piece from a sheet metal blank. Weld flanges 33, which extend along the edges of the longitudinal beams 30 or respectively the branches 31, 32, are provided in order to be welded respectively on the undersides of the front floor panels 3, so that the longitudinal beams 30 or respectively branches 31, 32 are respectively supplemented with the floor panels 3 to form high-grade rigid profiles with a closed cross-section. Supporting surfaces 34, 35 are formed respectively at the free ends of the branches 31, 32, in order to fit closely from below against the flanks 20 of the central tunnel 1 or respectively the inner sill profiles 14 and to make possible a welding therewith over a large area. The force is thus distributed, which is transmitted in the case of a frontal collision from the bumper to the longitudinal beams 30, via the branches 31, 32 on the one hand to the sill profiles 14, 15 and on the other hand to the central tunnel 1 and the channels 22 flanking it.

Figure 4:
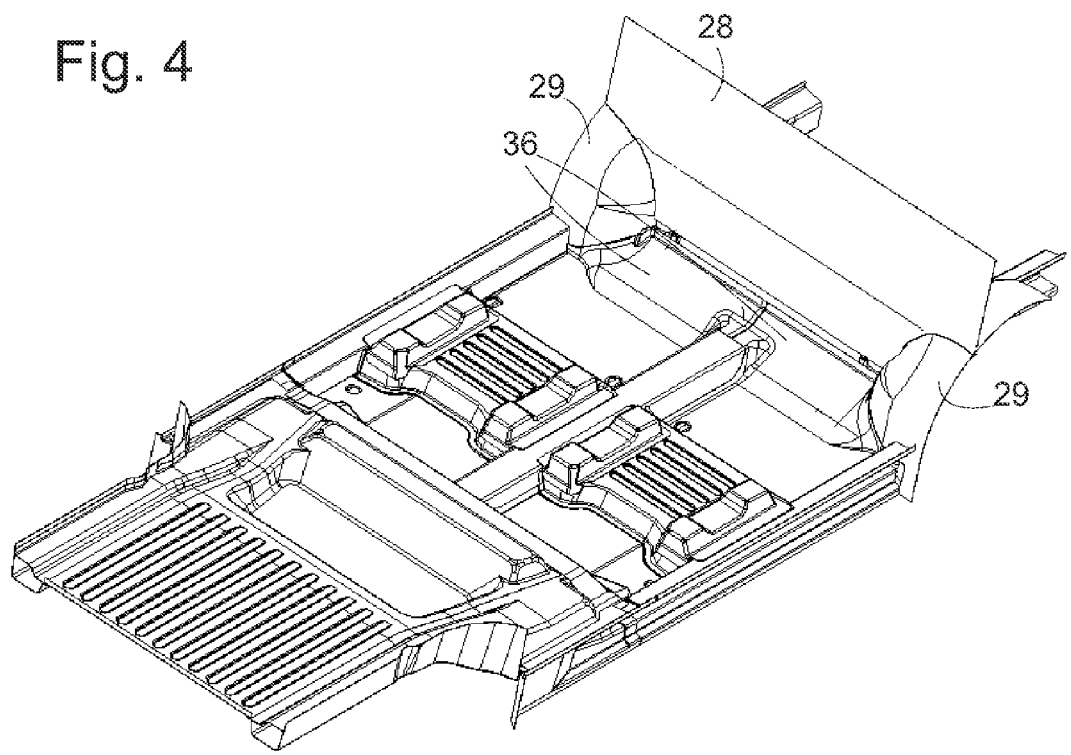
FIG. 4 is the central region and the front and rear regions in the joined-together state.

FIG. 4 shows the regions connected for the complete chassis structure, in the same perspective as FIG. 1 and FIG. 3. A drawn-up front edge 36 of the two front floor panels 3 is securely connected on the one hand with the end wall 28 and on the other hand with the wheel arches 29 adjoining thereto. The inner sill profiles 14 are connected together with drawn-forward connection pieces 37 (see FIG. 3) of the rear region 26, and welded.

Figure 5:
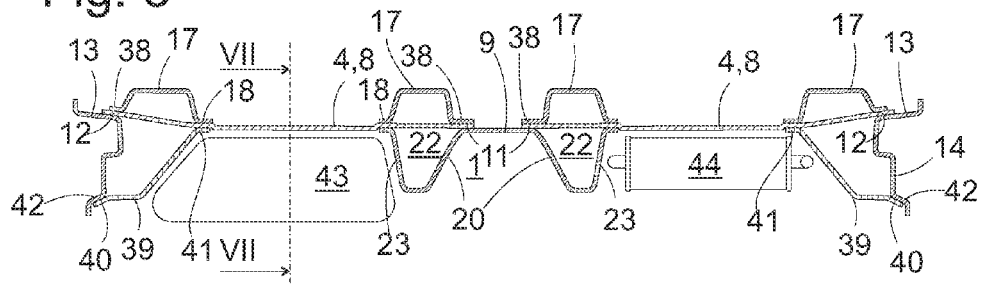
FIG. 5 is a cross-section through the chassis structure at the height of a central floor panel.

FIG. 5 shows a diagrammatic cross-section through the chassis structure at the height of the central floor panels 4. Their core sections 8 lie substantially at the same height as the upper side 9 of the central tunnel 1 and the upper shoulder 13 of the inner sill profiles 14. The flanges 11, 12 of the central floor panel 4, which are welded to the upper side 9 or respectively to the inner sill profile 14, are substantially covered by the likewise welded fastening flanges 38 of the mounting elements 17. The outer flanks 23 of the channels 22 support the central floor panel 4 respectively precisely beneath the fastening flanges 18. The two mounting elements 17, adjacent to the sill profiles 14, 15, are supported on their side facing away from the sill beneath the floor panel 4 by a sill reinforcing element 39 (see also FIG. 2), which travels along over the same length as the channels on the plate sections 2 and sill profiles 14 and has on its longitudinal edges two flanges 40, 41, one of which, 40, is welded to a substantially horizontal shoulder 42 of the sill profile 14, and the other, 41, is welded to each floor panel 3, 4, 5 of the plate section 2. The sill reinforcing elements 39 and the channels 22 delimit downwardly-open recesses of the chassis structure, in which a fuel tank 43, an exhaust gas filter or catalyst 44 or suchlike can be accommodated.

Figure 6:
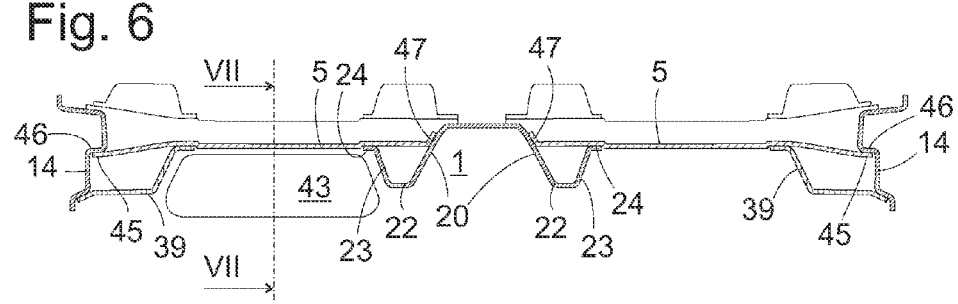
FIG. 6 is a cross-section analogous to FIG. 5 at the height of a rear floor panel.

FIG. 6 shows a cross-section, analogous to FIG. 5, through the chassis structure in a plane running through the rear floor panels 5. Whereas the central floor panels 4 are fastened by means of the flanges 11, 12 resting respectively at the top on the upper side 9 of the central tunnel 1 or respectively the shoulder 13 of the sill profile 14, an outer flange 45 of the rear floor panel 5 is welded from below against a further, substantially horizontal, shoulder 46 of the sill profile 14. The outer flank 23 of the channel 22 is reduced in its height compared with FIG. 5, but also has the weld flange 24 here, which supports the floor panel 5 spaced apart from its inner edge 47. The inner edge 47 is formed as an upwardly angled flange, which is welded to the flank 20 of the central tunnel 1. The sill reinforcing element 39 is also welded here on the one hand on the shoulder 42 and on the other hand on the underside of the floor panel 5, spaced apart from its outer flange 45. A third cross-section through a plane running through the front floor panels 3 of the chassis structure is not illustrated specifically in a figure, because the fastenings of the front floor panels 3 are of similar type to those shown in FIG. 6 for the rear floor panels 5.

Figure 7:
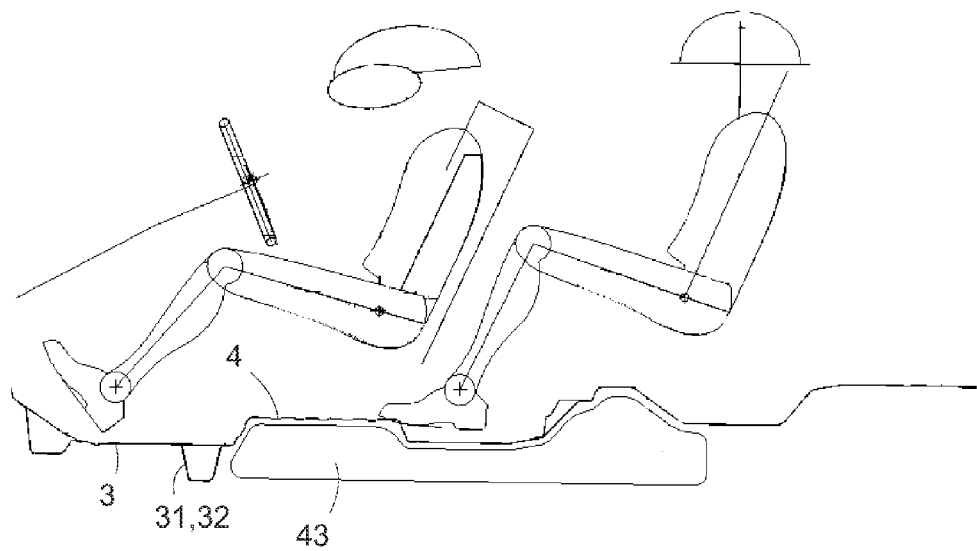
FIG. 7 is a diagrammatic longitudinal section through the central region of the chassis structure shown in FIG. 1 and FIG. 2.

FIG. 7 shows a diagrammatic longitudinal section through the chassis structure along the plane designated in FIG. 5 and FIG. 6 by VII-VII. The tank 43 fills the recess here beneath the central floor panel 4, a flatter recess between the sill reinforcing element 39 and the channel 22 beneath the rear floor panel 5 and also a recess formed beneath the rear seats in the rear region 26. The branches 31, 32 welded to the underside of the front floor panel 3 extend slightly further downwards than the bottom of the tank 43, so that, when the vehicle travels over an object on the roadway, this can come in contact with the branches 31, 32 if necessary, but not with the tank 43 which is protected by them.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A chassis structure for a vehicle, comprising:
    a central tunnel extending in a longitudinal direction of the vehicle;
    plate sections extending on both sides of the central tunnel; and
    two longitudinal beams constructed in one piece with an inner branch and an outer branch, the two longitudinal beams projecting over a front edge of the plate sections,
    wherein the inner branch extends on one of the plate sections to the central tunnel,
    wherein the outer branch overlaps and is connected with an outer sill that extends on an edge facing away from the central tunnel of one of the plate sections, and
    wherein the inner branch and the outer branch extend substantially at right-angles to the two longitudinal beams such that the inner and outer branches are disposed entirely in a transverse direction of the vehicle.

2. The vehicle chassis structure according to claim 1, wherein the inner branch and the outer branch are hat-shaped in a cross-section with marginal webs fastened on the plate sections with a formation of a cavity.

3. The vehicle chassis structure according to claim 2, further comprising a central tunnel reinforcing element on a side of the central tunnel extending in a longitudinal direction and delimiting with the central tunnel at least one cavity extending in the longitudinal direction.

4. The vehicle chassis structure according to claim 3, wherein the central tunnel reinforcing element is arranged on each side of the central tunnel and each cavity delimited by the central tunnel reinforcing element extends along an edge at which the central tunnel abuts the plate section adjacent on the respective side to the central tunnel.

5. The vehicle chassis structure according to claim 4, wherein the central tunnel reinforcing element is joined from below onto the plate section.

6. The vehicle chassis structure according to claim 4, wherein the central tunnel reinforcing element is constructed in one piece with the central tunnel and an outer edge of the central tunnel reinforcing element is fastened to an underside of an adjacent plate section and an inner edge of the plate section is fastened to a flank of the central tunnel.

7. The vehicle chassis structure according to claim 6 wherein at least one of the plate sections comprises a front floor panel, a rear floor panel and a central floor panel arranged between the front floor panel and the rear floor panel.

8. The vehicle chassis structure according to claim 7, wherein the central tunnel reinforcing element extends in one piece continuously from the front floor panel to the rear floor panel.

9. The vehicle chassis structure according to claim 7, wherein the central floor panel comprises fastening flanges lying on the front edge and the rear edge at a level of the front floor panel and the rear floor panel and on at least one lateral edge a fastening flange lying at a higher level for connection with the central tunnel.

10. The vehicle chassis structure according to claim 7, wherein the outer sill has at least one first shoulder fastened on the front floor panel and the rear floor panel, and a second shoulder, fastened on the central floor panel.

11. The vehicle chassis structure according to claim 7, further comprising a sill reinforcing element having an inner edge fastened to an underside of the front floor panel, a middle floor panel, and the rear floor panel, and an outer edge fastened to the outer sill.

12. The vehicle chassis structure according to claim 7, wherein a component is accommodated at least partially under the central floor panel.

13. The vehicle chassis structure according to claim 12, wherein the component is a tank.

14. The vehicle chassis structure according to claim 12, wherein the component is a part of an exhaust gas system.

15. The vehicle chassis structure according to claim 12, wherein the inner branch and the outer branch are fastened to the underside of the front floor panel and reach out further downwards than the component.

16. The vehicle chassis structure according to claim 1, further comprising a weld flange extending from the central tunnel reinforcing element for supporting at least one of the plate sections.

17. The vehicle chassis structure according to claim 16, wherein a height of the central tunnel reinforcing element is variable along the longitudinal length of the central tunnel.

* * * * *